US011038235B2

(12) United States Patent
Ye

(10) Patent No.: US 11,038,235 B2
(45) Date of Patent: Jun. 15, 2021

(54) ELECTRIC SCOOTER WITH BATTERY PACK INTERCHANGEABLE WITH POWER AND GARDENING TOOL

(71) Applicant: Avant Enterprises, Inc., Industry, CA (US)

(72) Inventor: Ying Ye, Chino Hills, CA (US)

(73) Assignee: Avant Enterprises, Inc., Industry, CA (US)

( * ) Notice: Subject to any disclaimer, the term of this patent is extended or adjusted under 35 U.S.C. 154(b) by 0 days.

(21) Appl. No.: 16/454,915

(22) Filed: Jun. 27, 2019

(65) Prior Publication Data

US 2020/0411820 A1 Dec. 31, 2020

(51) Int. Cl.
| | |
|---|---|
| *H01M 50/20* | (2021.01) |
| *B60L 50/60* | (2019.01) |
| *B62K 11/00* | (2006.01) |
| *B62M 6/90* | (2010.01) |
| *B60K 1/04* | (2019.01) |

(52) U.S. Cl.
CPC ............. *H01M 50/20* (2021.01); *B60L 50/66* (2019.02); *B62K 11/00* (2013.01); *B62M 6/90* (2013.01); *B60K 2001/0455* (2013.01); *B62K 2202/00* (2013.01)

(58) Field of Classification Search
CPC ......... B60R 11/04; B62K 15/006; B62K 5/08; B62K 5/06; B62J 1/12; B62J 1/04; B62J 7/06
See application file for complete search history.

(56) References Cited

U.S. PATENT DOCUMENTS

| | | | | |
|---|---|---|---|---|
| 8,317,206 B1* | 11/2012 | Novitzky | ............. | A63C 17/008 280/87.042 |
| 8,851,215 B2* | 10/2014 | Goto | ....................... | B60L 50/64 180/65.1 |
| 8,984,711 B2 | 3/2015 | Ota et al. | | |
| 9,168,965 B2 | 10/2015 | Lovley, II et al. | | |
| 9,282,695 B2 | 3/2016 | Goto | | |
| 9,472,979 B2 | 10/2016 | Mergener | | |

(Continued)

FOREIGN PATENT DOCUMENTS

| | | |
|---|---|---|
| CN | 205952205 U | 2/2017 |
| CN | 206914562 U | 1/2018 |

(Continued)

OTHER PUBLICATIONS

European search report from Application No. 119185582.4 dated Jan. 17, 2020, 10 pages.

*Primary Examiner* — John D Walters
*Assistant Examiner* — James J Triggs
(74) *Attorney, Agent, or Firm* — Weisun Rao; Jun Chen; Venture Partner, LLC

(57) ABSTRACT

Among others, the present invention provides electric scooters each including a vertical tube, a handle bar element, a platform configured to support a rider, at least one front wheel and at least one rear wheel, an electric motor configured to provide a mechanical power to at least one of the front and rear wheels, and a battery housing configured to removably receive and hold one or more battery packs. The one or more battery packs are configured to power the electric scooter, and at least one battery pack is capable of being used as a power supply of an electric power or gardening tool.

20 Claims, 9 Drawing Sheets

(56) References Cited

U.S. PATENT DOCUMENTS

| | | | | |
|---|---|---|---|---|
| 10,384,556 B1* | 8/2019 | Miyata | .................... | B60L 50/66 |
| 2002/0005309 A1* | 1/2002 | Patmont | ................... | B62M 6/45 |
| | | | | 180/220 |
| 2004/0050603 A1 | 3/2004 | Jaeger | | |
| 2012/0048630 A1* | 3/2012 | Nishiura | ............. | H01M 2/1077 |
| | | | | 180/65.31 |
| 2017/0001683 A1* | 1/2017 | Gerencser | .............. | B62K 3/002 |

FOREIGN PATENT DOCUMENTS

| | | |
|---|---|---|
| DE | 102009046967 A1 | 5/2011 |
| EP | 2386474 A1 | 11/2011 |
| WO | 01/17844 A1 | 3/2001 |
| WO | 2013138955 A1 | 9/2013 |
| WO | 2014/080412 A2 | 5/2014 |

* cited by examiner

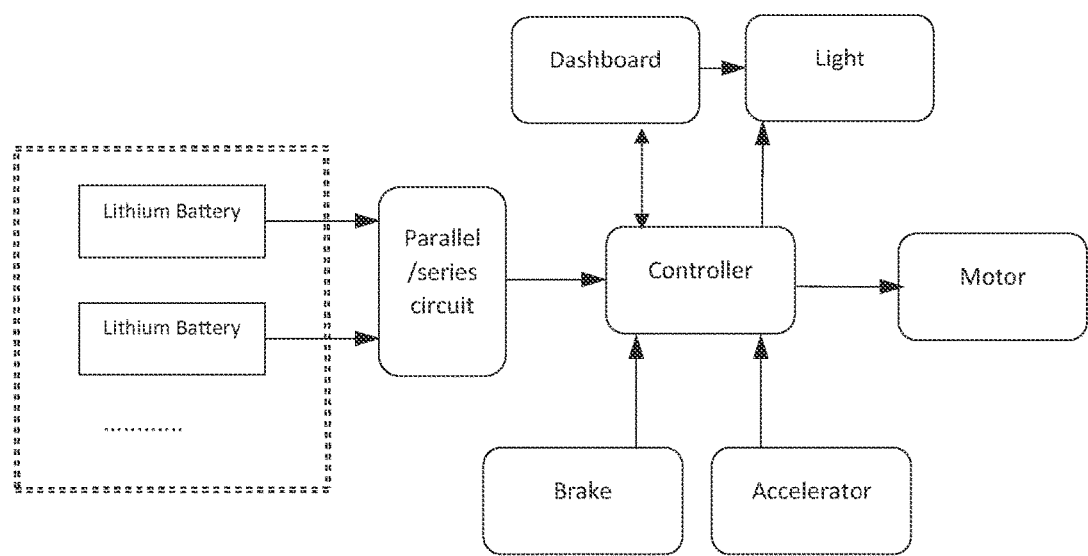
FIG. 1A
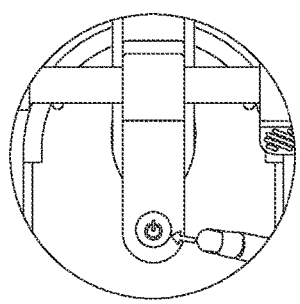 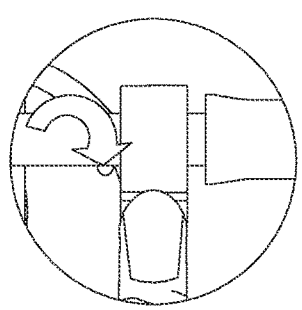 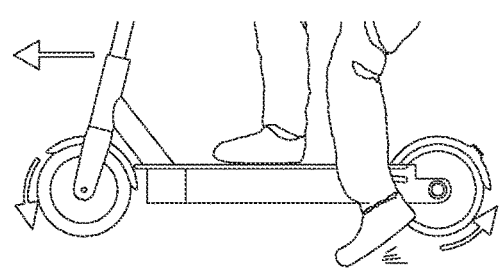
FIG. 1B　　　　　FIG. 1C　　　　　FIG. 1D

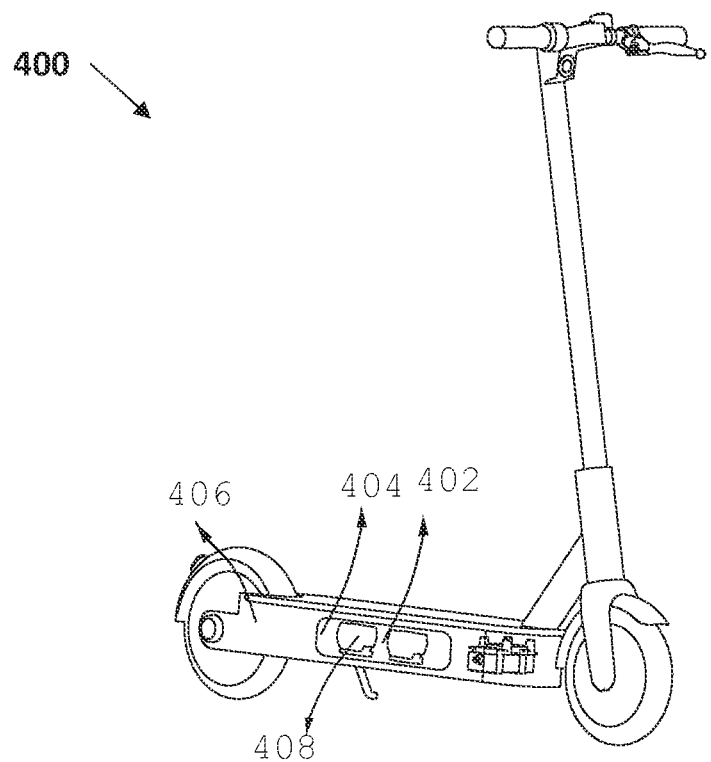
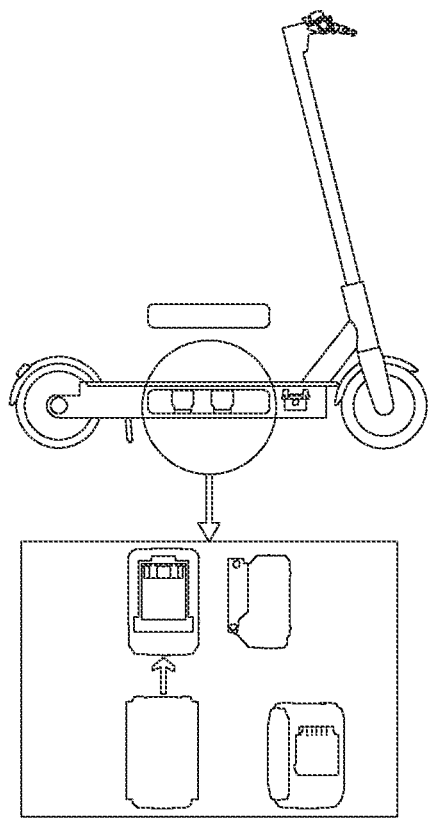
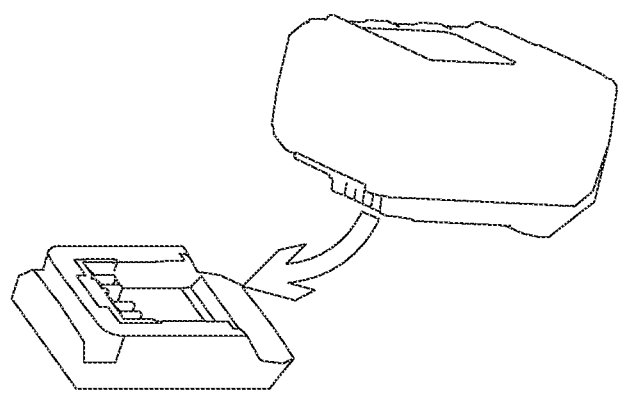
FIG. 5
FIG. 6A                    FIG. 6B

ELECTRIC SCOOTER WITH BATTERY PACK INTERCHANGEABLE WITH POWER AND GARDENING TOOL

BACKGROUND OF THE INVENTION

An electric scooter powered by a battery pack is known in the art. Conventional electric scooters include a specially designed battery with a matching capacity. Typically, the storage battery or lithium battery for the conventional electric scooters is integrally built-in, has a large size, and is inconvenient to be carried out. Most electric scooters have batteries fixed inside their frames or other parts, which are difficult to be disassembled. Therefore, it is inconvenient to charge conventional scooters. When an electrical scooter needs to be charged, the scooter needs to be placed close to a power supply, and requires a special charger for charging its battery, as well as a space near the power supply for parking the scooter. In addition, due to the difficulty to disassemble the battery system in the conventional scooters, when a user needs a new battery or a larger-capacity battery, it requires a professional to replace the whole battery pack system. As a result, such a battery replacement process can be very expensive.

Due to the drawbacks of the conventional electrical scooters, there is a pressing need to find solutions to have an electric scooter with a battery pack, which is easy to be disassembled, charged, and carried; has a reduced cost for battery replacement and an improved compatibility; and with its battery pack and charger capable of being shared with other lithium electric power or gardening tools.

SUMMARY OF THE INVENTION

The present invention in general relates to a novel type of electric scooters with detachable or removable battery pack (s). The electric scooter utilizes a battery housing to removably receive and hold one or more battery packs, particularly lithium battery packs.

One aspect of this invention utilizes a battery pack that is originally intended to be used for electric power or gardening tools, such that the battery pack is interchangeable between the electric scooters of this invention and other electric power or gardening tools. Additionally, since such a battery pack does not require a special charger, the electric scooters according to the present invention can share its battery pack(s) and the charger with other lithium electric power or gardening tools.

Another aspect of this invention provides varies connections of the lithium battery packs (e.g., slide-type and insert-type battery packs) in the electric scooters. A further aspect of this invention provides a battery housing either with or without a spring element, wherein the spring element helps the removal or ejection of the battery packs (e.g., slide-type battery packs).

As further described in this document, the present invention provides varies assemblies and locations of the battery packs in the scooters (e.g., inside a recessed battery housing on the top side of the platform, inside a recessed battery housing on a vertical side of the platform, or inside a battery box mounted to the vertical tube of the scooter).

In one aspect, the present invention provides an electric scooter comprising: a vertical tube, connected to a handle bar element; a platform configured to support a rider; at least one front wheel and at least one rear wheel; an electric motor configured to provide a mechanical power to at least one of the front and rear wheels; and a battery housing configured to removably receive and hold one or more battery packs, wherein the one or more battery packs are configured to power the electric scooter, and at least one battery pack is capable of being used as a power supply of a separate electric power or gardening tool.

In some embodiments, the battery pack is a lithium battery pack.

In some embodiments, the battery pack is a slide-type battery pack. In some other embodiments, the battery pack is an insert-type battery pack.

In some embodiment, the battery housing comprises a recessed area on top side of the platform. The one or more battery packs may slide on or be inserted into a battery holder inside the battery housing from the top of the platform, thereby connecting to the scooter.

In some embodiments, the battery housing comprises a recessed area on a vertical side of the platform. The one or more battery packs may slide on or be inserted into a battery holder inside the battery housing from the side of the platform.

In some embodiments, the battery housing comprises a battery box mounted to the vertical tube. The one or more battery packs may slide on or be inserted into a battery holder in the battery box, thereby connecting to the scooter.

In some embodiments, the battery housing comprises one or more sockets for plugging the battery packs.

In some embodiments, the battery housing comprises a spring to facilitate the removal or ejection of the one or more battery packs.

In some embodiments, the scooter comprises a circuit for electrically connect the battery packs to the electric motor. The circuit comprises a series circuit and/or a parallel circuit.

In some embodiments, the scooter comprises a removable cover plate to cover the battery housing.

In some embodiments, the scooter comprises one or more AC charging ports or USB output ports. In some further embodiments, the one or more AC charging ports or USB output ports are located on a side of the platform or on the battery box.

In some embodiments, the scooter can be either foldable or fixed (non-foldable). In some embodiments, the scooter is at least partly foldable. For instance, the vertical tube of a foldable scooter can be pivotally connected to the platform, for pivoting the scooter between an upright position for use and a collapsed or laid-over position for storage. Moreover, the handle bar may be collapsible in order to save space for storage.

As used herein, the term "or" is meant to include both "and" and "or." In other words, the term "or" may also be replaced with "and/or."

As used herein, the singular forms "a," "an" and "the" are intended to include the plural forms as well, unless the context clearly indicates otherwise.

As used herein, the spatially relative terms, such as "top", "bottom", "inside", "outside", "above", and "under" may be used herein for ease of description to describe one element or feature's relationship to another element(s) or feature(s) as illustrated in the figures. The terms are not intended to require the described elements or structures in a specific direction, and are not intended to limit the scope of this invention as such.

BRIEF DESCRIPTIONS OF THE FIGURES

FIGS. 1A-1D illustrate a system diagram and operating principle of an electric scooter of this invention.

Figure 2:
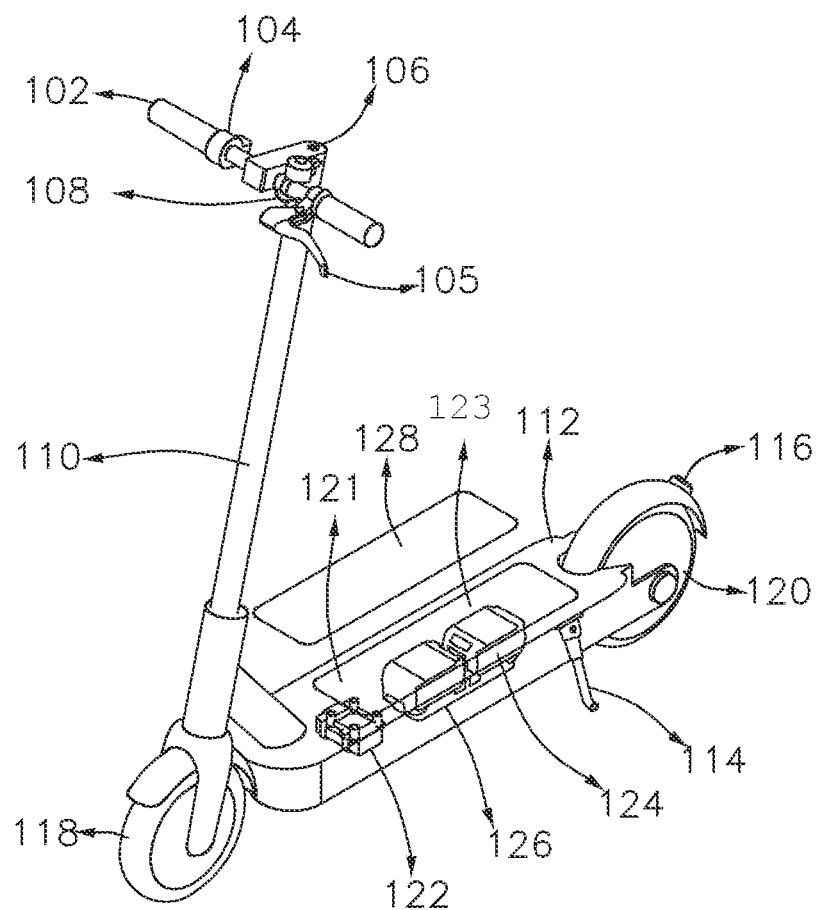
FIG. 2 is a perspective illustration of an electric scooter of this invention, in which one or more detachable battery packs can be placed inside the platform, by either sliding or being inserted from the top of the platform.

FIGS. 3A-3D provide perspective illustrations of an exemplary battery assembly, showing an electric scooter of FIG. 2 with slide-type battery packs.

Figure 4A:
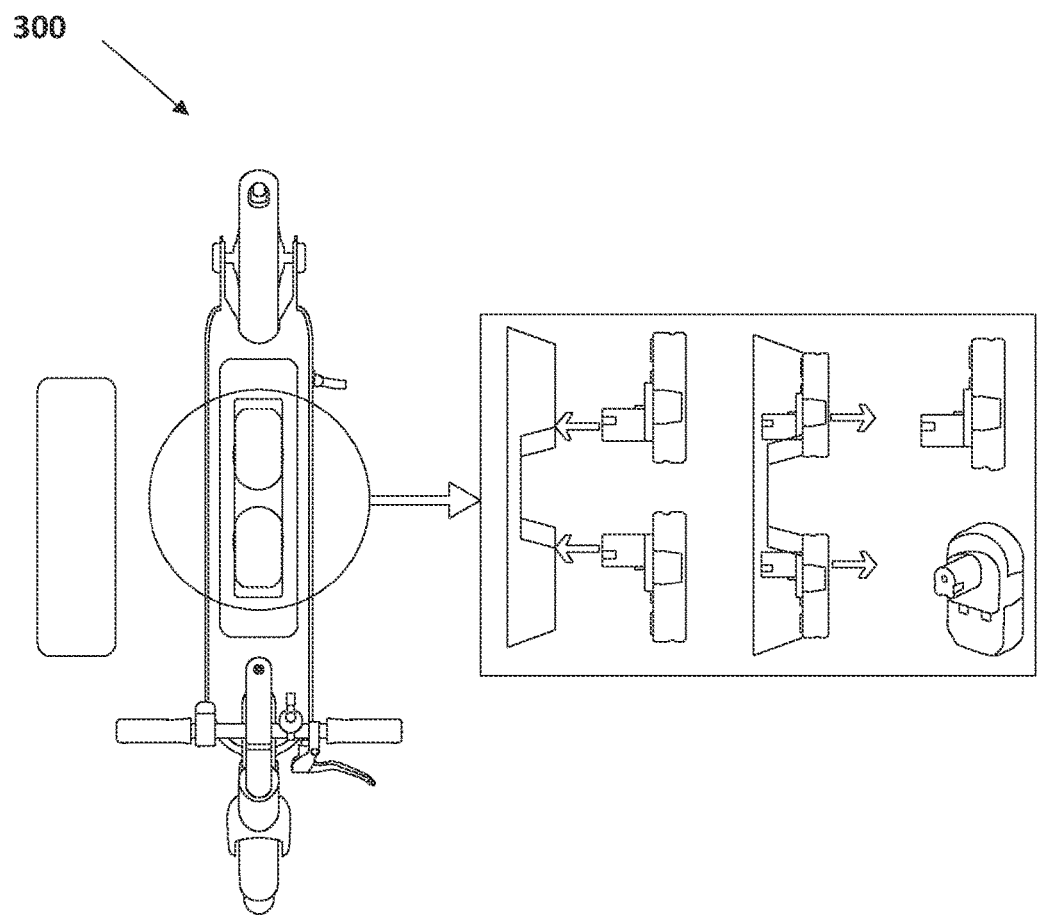
Figure 4B:
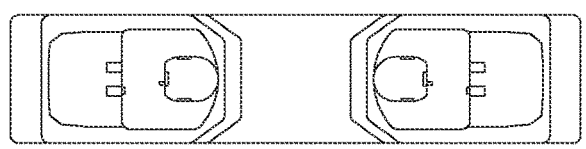
Figure 4C:
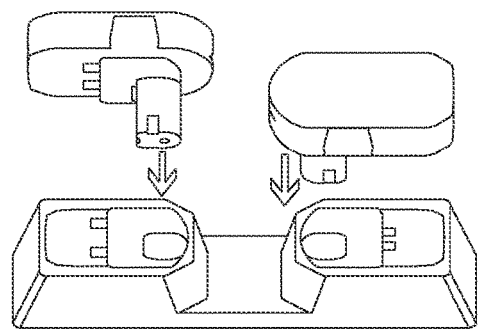

FIGS. 4A-4C provide perspective illustrations of an exemplary battery assembly, showing an electric scooter of FIG. 2 with insert-type battery packs.

FIG. 5 is a perspective illustration of an electric scooter of this invention, in which one or more detachable battery packs can be placed inside a vertical side of the platform.

FIGS. 6A-6B provide perspective illustrations of an exemplary battery assembly, showing an electric scooter of FIG. 5 with slide-type battery packs.

Figure 7A:
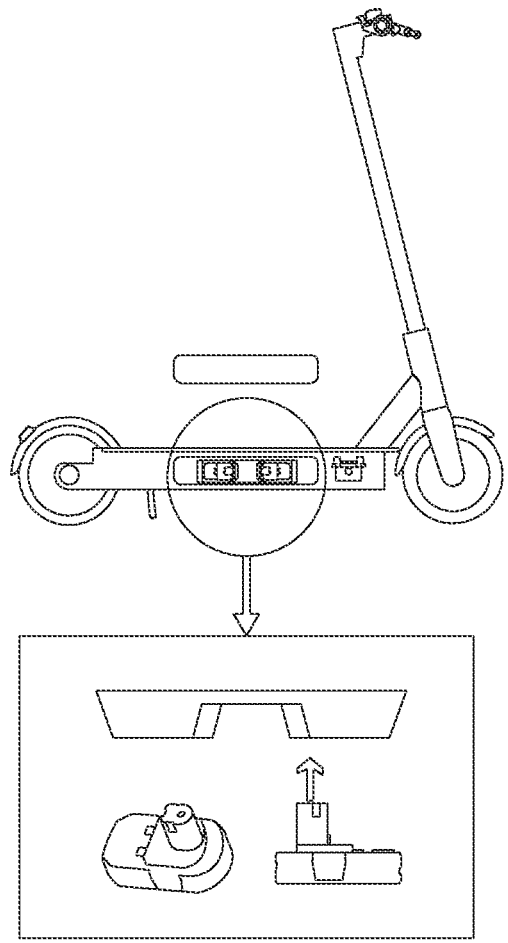
Figure 7B:
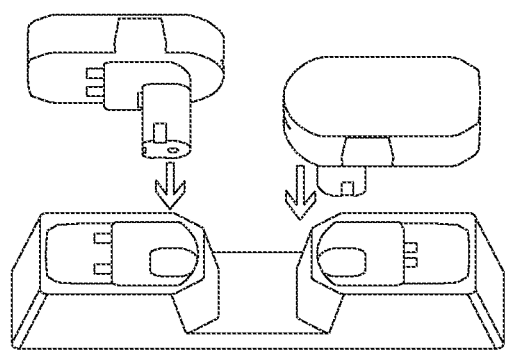

FIGS. 7A-7B provide perspective illustrations of an exemplary battery assembly, showing an electric scooter of FIG. 5 with insert-type battery packs.

Figure 8:
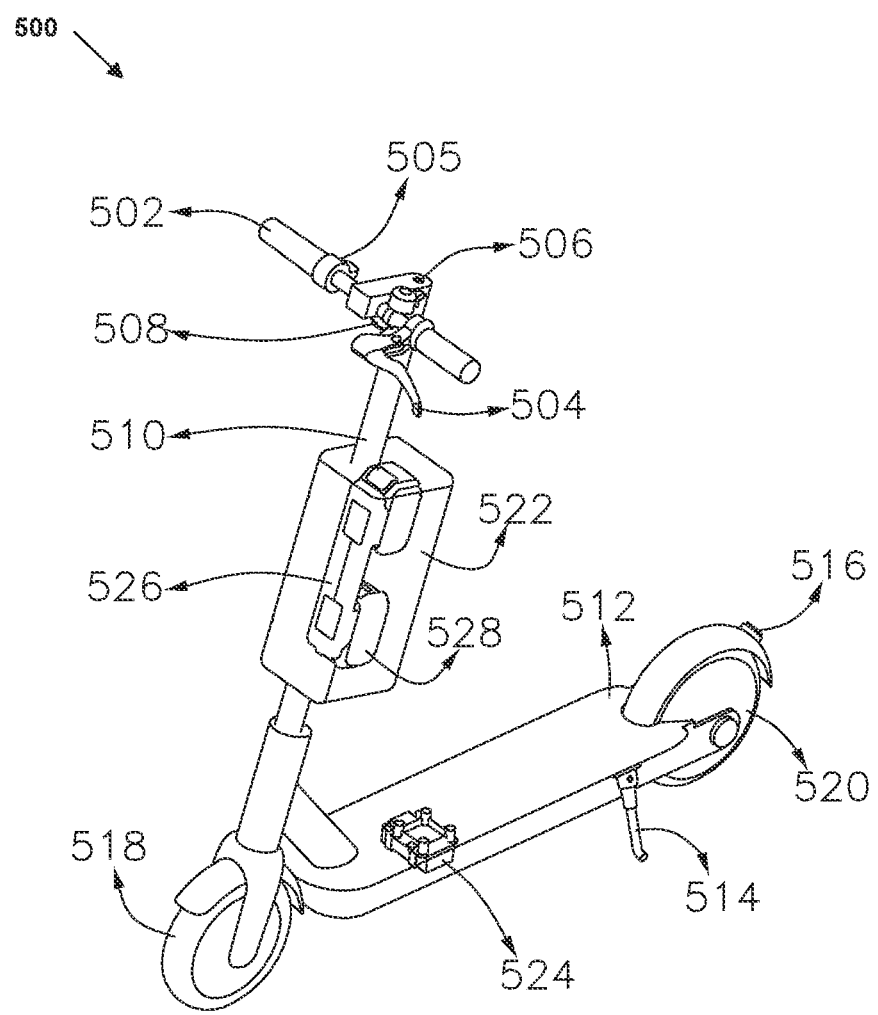

FIG. 8 is a perspective illustration of an electric scooter of this invention, in which one or more detachable battery packs can be placed inside a battery box mounted to the vertical tube of the scooter.

Figure 9:
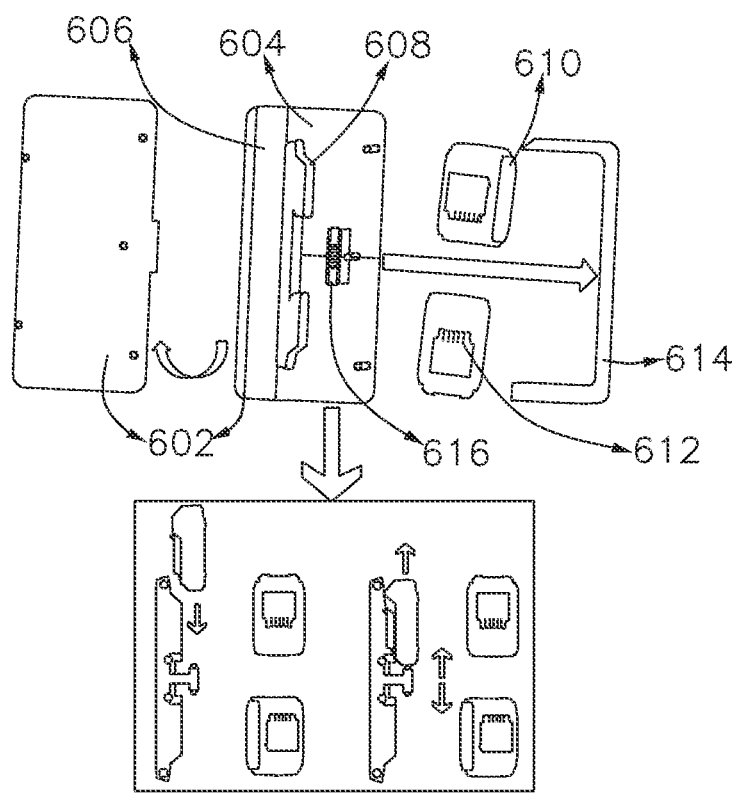

FIG. 9 provides a perspective illustration of an exemplary battery assembly, showing an electric scooter of FIG. 8 with slide-type battery packs.

Figure 10:
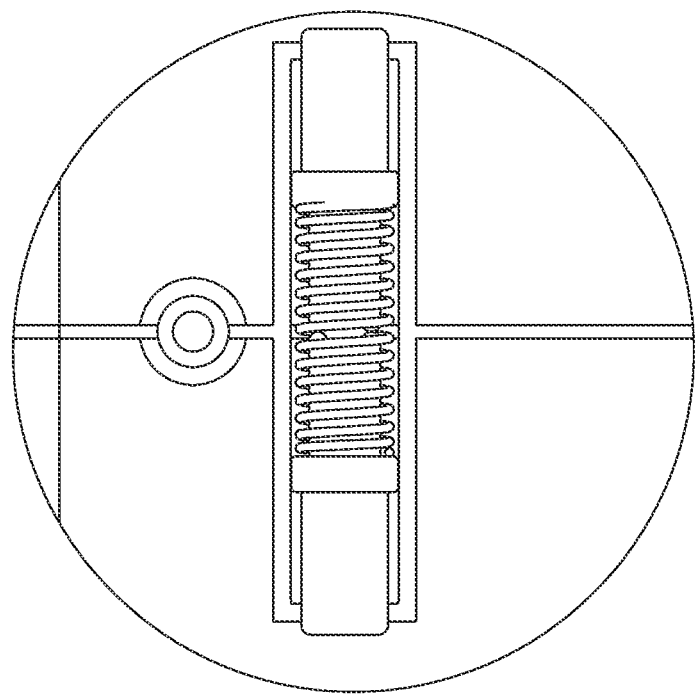

FIG. 10 provides a perspective illustration of a spring system inside the assembly of FIG. 9.

Figure 11:
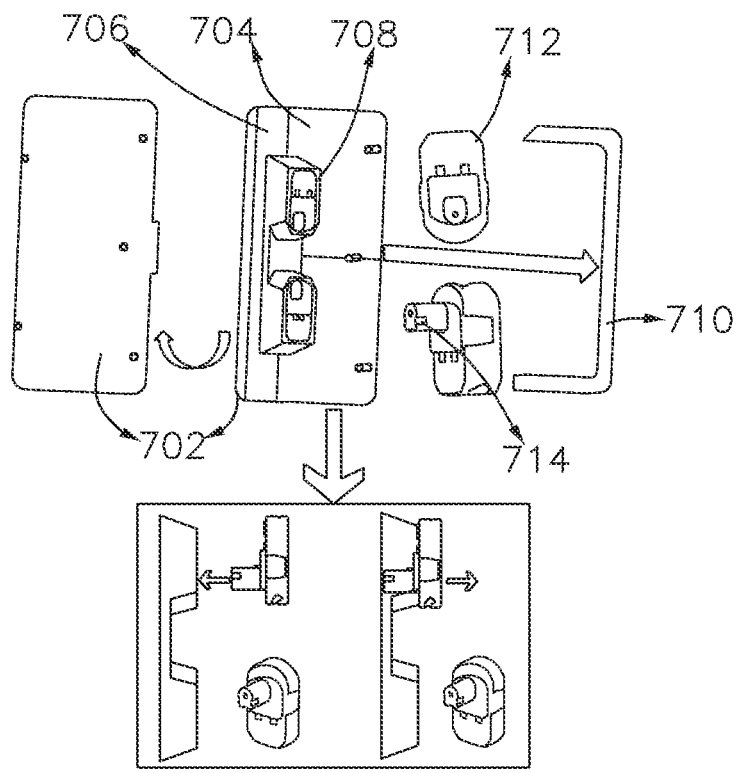

FIG. 11 provides a perspective illustration of an exemplary battery assembly, showing an electric scooter of FIG. 8 with insert-type battery packs.

Figure 12:
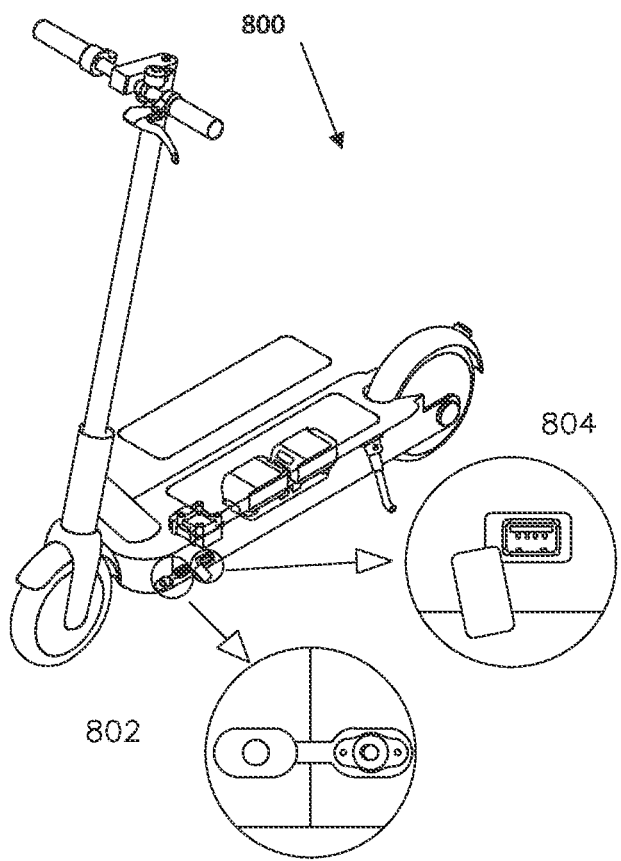

FIG. 12 provides a perspective illustration of an electric scooter of this invention, including an AC charging port and one or more USB output ports.

DETAILED DESCRIPTION OF THE INVENTION

One aspect of this invention relates to a novel type of electric scooters with detachable or removable battery pack(s). The electric scooter utilizes a battery housing to removably receive and hold one or more battery packs, particularly lithium battery packs (e.g., slide-type or insert-type battery packs). The battery packs may be mounted via varies assemblies at different locations in the scooters. For instance, one or more battery packs may be placed inside a recessed battery housing on the top side of the platform, or inside a recessed battery housing on a vertical side of the platform, or inside a battery box mounted to the vertical tube of the scooter. When a battery pack needs to be charged, it can easily be removed from the battery housing and recharged by a matching charger.

A key component of this invention is that the lithium battery packs utilized in the scooters are the same types of battery packs used in other lithium electric power or gardening tools. Therefore, such a battery pack is interchangeable between the scooters of this invention and other common electric power or gardening tools. The present invention, therefore, allows the battery pack and the charger to be sharable with other lithium electric power or gardening tools.

Comparing with conventional electric scooters, the novel type of the electric scooters according to the present invention has at least the following advantages: (i) since the battery pack can be independently disassembled, single or multiple battery packs can be charged separately from the scooters, thereby making battery charging much easier; (ii) the sharing of the lithium battery packs between the electric scooters and the electric power or gardening tools allows better use of the energy; and (iii) the battery replacement and maintenance become much easier and less expensive, without requiring a professional to do so.

Set forth below are several illustrations or examples of apparatus of this invention containing electric scooters with detachable battery pack.

FIGS. 1A-1D illustrate an operating system and its operating principle of an electric scooter of this invention. The system may include one or more detachable lithium battery packs connected to a controller via a circuit (e.g., parallel and/or series circuit), in which the controller is also connected to a brake, an accelerator, a dashboard, a light (or multiple lights), and a motor (or multiple motors)—e.g., via wired or wireless communications. A user riding the scooter may use the dashboard to monitor and control the scooter. As further shown in FIGS. 1C-1D, after the battery packs are inserted or connected, a user may start the power switch, and then start the accelerator to speed up the ride.

FIG. 2 is a perspective illustration of electric scooter 100. Electric scooter 100 includes handle bar element 102, accelerator 104, brake 105, dashboard switch 106, and front light 108. Electric scooter 100 also includes vertical tube 110, platform 112 (bottom foot pedal) to support a rider, (foldable) supporting element 114 to support the scooter when it is standing, rear light 116, and at least one front wheel 118 and at least one rear wheel 120. At least one of the wheels is a drive wheel driven by an electric motor.

The platform 112 includes a recessed area or compartment 121 on its top side to contain controller 122, and form a battery housing 123 to removably receive one or more detachable lithium battery packs 124 (e.g., through battery connector or socket 126). The housing 123 may be designed to receive different types of battery packs, e.g., either slide-type battery packs or insert-type battery packs. Controller 122 is connected to the battery packs 124, the dashboard, the electric motor, and other electric components via wires. Although the battery housing 123 may be able to receive and hold (e.g., lock) multiple battery packs, the operation of scooter of this invention does not require the assembly of all the battery packs. The scooters of this invention may still be powered and operated when only one battery pack is mounted inside the housing. In some embodiments, the battery housing includes a spring to facilitate the removal or ejection of the battery (e.g., the slide-type battery packs). Scooter 100 also includes removable cover plate 128 to cover the housing 123 and to protect against water and dust. The size and shape of the battery housing according to the present invention may vary based on the size, capacity and numbers of the lithium battery packs.

Such a battery system is configured to provide a power supply to power the electric motor, thereby providing mechanical power to at least one of the front and rear wheels. The battery packs, together with the brake, controlling dashboard and controller, are configured to drive the electric motor and control the ride. Such battery packs can be easily removed and recharged by a standard charger for lithium battery packs. Notably, the lithium battery packs 124 may also be used as a power source to other common electric power or gardening tools. In other words, the battery pack is interchangeable between electric scooter 100 and a sperate electric power or gardening tool.

According to the present invention, when the battery of the scooter runs low (as can be indicated on the dashboard), a user can open a cover plate, remove the lithium battery pack(s) from the battery housing by hand, and use a suitable charger to charge the battery pack or replace it for a fully charged battery pack, thereby continuing the ride.

Figure 3A:
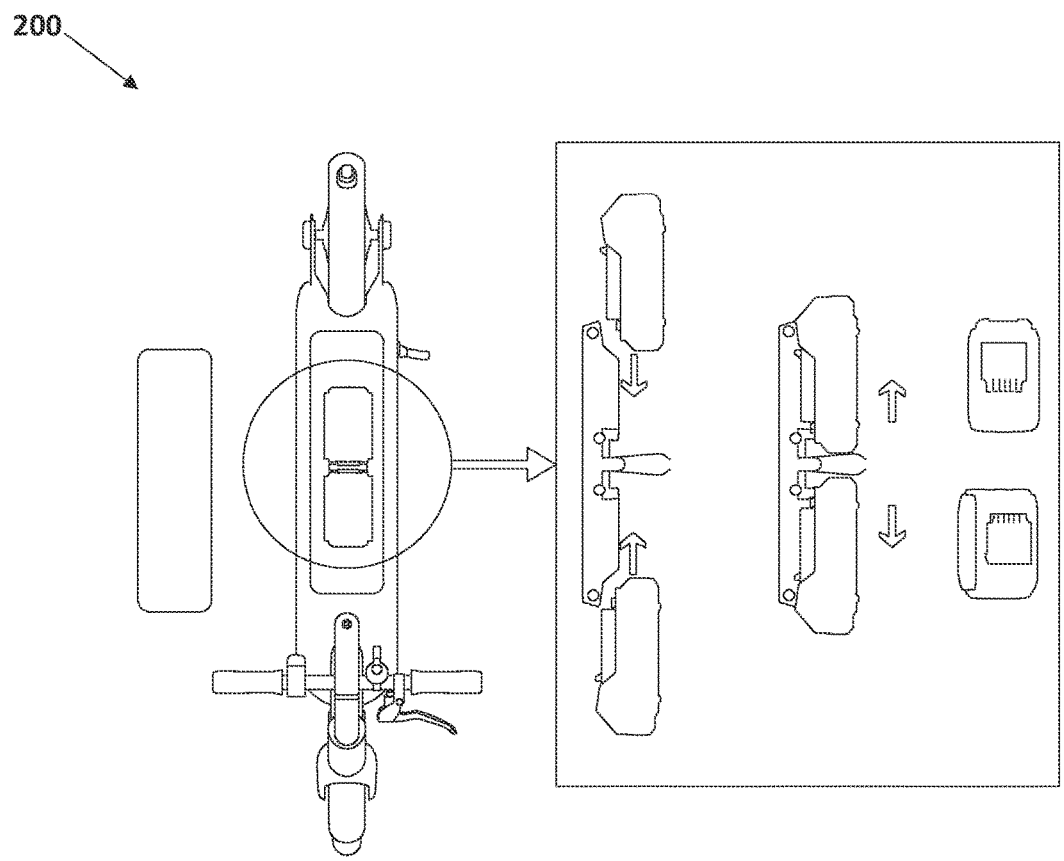
Figure 3B:
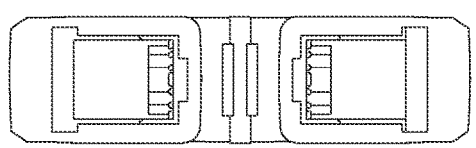
Figure 3C:
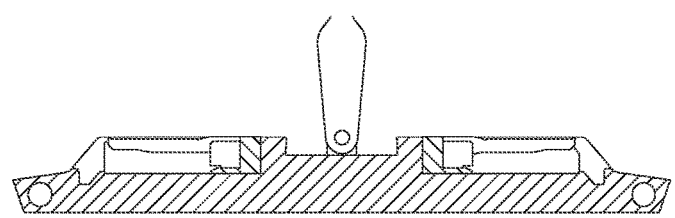
Figure 3D:
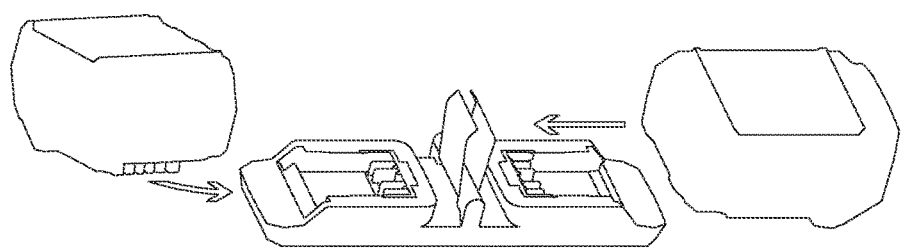

In some embodiments, a scooter as descried in FIG. 2 is configured to utilize slide-type battery packs. As shown in FIGS. 3A-3D, electric scooter 200 includes a battery housing on the top side of the platform (which may be covered by a removable cover plate). The battery housing includes a holder (with two connectors or sockets) to receive one or two slide-type battery packs. As described above, the battery packs of this invention may also be used for other common lithium electric power or gardening tools. FIG. 3B is a top view of the holder, and FIG. 3C is a cross-sectional side view of the holder. FIG. 3D shows battery packs sliding onto the holder via opposite directions. As such, one or more slide-type battery packs can slide horizontally onto the holder, thereby connecting to the controller and providing a power to the electric motor.

In some other embodiments, a scooter as described in FIG. 2 is suitable for insert-type battery packs. As shown in FIGS. 4A-4C, electric scooter 300 includes a battery housing on the top side of the platform, which includes a holder (with two connectors or sockets) to receive one or two insert-type battery packs. FIG. 4B is a top view of the holder, showing that the holder is capable of removably and independently receiving and holding two insert-type battery packs. FIG. 4C shows that the two insert-type battery backs can be inserted vertically into the holder.

FIG. 5 is a perspective illustration of electric scooter 400, in which the battery housing 402 is a recessed area 404 located on a side of the platform 406 such that one or more detachable battery packs 408 can be mounted into the vertical side of the platform. The battery housing may also include a cover plate to cover its opening. The battery packs included by electric scooter 400 can be either slide-type or insert-type battery packs, and are interchangeable between electric scooter 400 and a common electric power or gardening tool.

As shown in FIGS. 6A-6B, the battery housing located on the side of the platform may include a holder (with two connectors or sockets) to removably receive two slide-type battery packs. As shown in FIG. 6B, each battery pack may independently slide up and be placed into the holder via their respective connectors.

Alternatively, FIGS. 7A-7B show another battery assembly, which includes a side battery housing for removably receiving two insert-type battery packs. As shown in FIG. 7B, each battery pack may independently be inserted and plugged into the battery housing from the side of the platform.

FIG. 8 is a perspective illustration of electric scooter 500, which includes vertical tube 510, to which a battery housing or box 522 is mounted. More specifically, electric scooter 500 also includes handle bar element 502, brake 504, accelerator 505, dashboard switch 506, and front light 508, platform 512 (bottom foot pedal) to support a rider, foldable supporting element 514 to support the scooter when it is standing, rear light 516, and at least one front wheel 518 and at least one rear wheel 520. At least one of the wheels is a drive wheel driven by an electric motor. The battery housing or box 522 is mounted to vertical tube 510. One or more lithium battery packs 528 (e.g., slide-type or insert-type battery packs) may be plugged inside battery housing 522 (e.g., via connectors or sockets 526), thereby powering scooter 500. The platform 512 includes a built-in controller 524, which is connected to the battery packs, the dashboard, the electric motor, and other electric components via wires. In some embodiments, the battery housing includes a spring to facilitate the removal or ejection of the battery (e.g., the slide-type battery packs). Scooter 500 may also include a removable cover plate to cover the housing and to protect against water and dust. The size and shape of the recessed housing may vary based on the size, capacity and numbers of the lithium battery packs.

Such a battery system is configured to provide a power supply to power the electric motor, thereby providing mechanical power to at least one of the front and rear wheels. The battery packs, together with the brake, controlling dashboard and controller, are configured to drive the electric motor and control the ride. The battery packs are easy to be removed and recharged. Also, such lithium battery packs may be used as a power source to other common electric power or gardening tools. In other words, the battery pack is interchangeable between electric scooter 500 and a sperate electric power or gardening tool.

FIG. 9 provides a perspective illustration of an exemplary battery assembly, showing an electric scooter of FIG. 8 with slide-type battery packs. The battery assembly includes battery housing or box 602 mounted to the vertical tube, for removably receiving two slide-type battery packs. More specifically, battery housing 602 includes compartment 604 for containing the battery packs, and connecting port 606 with sockets 608, into which the battery packs 610 can plug through battery connectors 612. Moreover, the scooter includes a cover plate 614 to cover the housing, and protect against water and dust. As such, when the cover plate is opened, two slide-type battery packs may independently slide on and be plugged into the sockets of the battery housing. [51] In addition, the battery system may include spring element 616, which facilitates the removal or ejection of the slide-type battery packs. FIG. 10 provides a more detailed illustration of the spring element 616. Such a spring element is not used for insert-type battery packs. [52] FIG. 11 provides a perspective illustration of an exemplary battery assembly, showing an electric scooter of FIG. 8 with insert-type battery packs. The battery assembly includes battery housing or box 702 mounted to the vertical tube of the scooter, compartment 704 for containing the battery packs, connecting port 706, and sockets 708, and removable cover plate 710. The battery packs 712 may be removably inserted into sockets 708, via their inserting connectors 714, thereby providing a power to the scooter.

FIG. 12 provides a perspective illustration of electric scooter 800. Electric scooter 800 includes an AC charging port 802 and/or one or more USB output ports 804. As such, the battery pack(s) can be charging directly without taking out from scooter and also can optionally become a power supply to charge another electric device via one of the USB output ports.

Although specific embodiments of this invention have been illustrated herein, it will be appreciated by those skilled in the art that any modifications and variations can be made without departing from the spirit of the invention. The examples and illustrations above are not intended to limit the scope of this invention. Any combination of embodiments of this invention, along with any obvious their extension or analogs, are within the scope of this invention. Further, it is intended that this invention encompass any arrangement, which is calculated to achieve that same purpose, and all such variations and modifications as fall within the scope of the appended claims.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example of a generic series of equivalent or similar features.

Other Embodiments

It is to be understood that while the invention has been described in conjunction with the detailed description thereof and accompanying figures, the foregoing description and accompanying figures are only intended to illustrate, and not limit the scope of the invention, which is defined by the scope of the appended claims. Other aspects, advantages, and modifications are within the scope of the following claims. All publications referenced herein are incorporated by reference in their entireties.

What is claimed is:

1. An electric scooter comprising:
a vertical tube, connected to a handle bar element;
a platform configured to support a rider;
at least one front wheel and at least one rear wheel;
an electric motor configured to provide a mechanical power to at least one of the front and rear wheels; and
a battery housing configured to removably receive and hold one or more battery packs, wherein the one or more battery packs are configured to power the electric scooter, and at least one battery pack is interchangeable between the electric scooter and a separate battery-operated electric power or gardening tool with an operating voltage range of 10.8 Voltage Direct Current to 60 Voltage Direct Current, and capable of being directly connected to the separate electric power or gardening tool and used as a power supply of the separate electric power or gardening tool.

2. The electric scooter of claim 1, wherein the battery pack is a lithium battery pack.

3. The electric scooter of claim 1, wherein the battery pack is a slide-type battery pack or an insert-type battery pack.

4. The electric scooter of claim 3, wherein the battery housing comprises a recessed area on top side of the platform.

5. The electric scooter of claim 3, wherein the battery housing comprises a recessed area on a vertical side of the platform.

6. The electric scooter of claim 3, wherein the battery housing comprises a battery box mounted to the vertical tube.

7. The electric scooter of claim 1, wherein the battery housing comprises one or more sockets for plugging the battery packs.

8. The electric scooter of claim 7, wherein the battery housing comprises a spring located between the two sockets to facilitate a removal of the one or more battery packs.

9. The electric scooter of claim 1, further comprising a circuit for electrically connect the battery packs to the electric motor.

10. The electric scooter of claim 9, wherein the circuit is either a series circuit or a parallel circuit.

11. The electric scooter of claim 1, further comprising a removable cover plate to cover the battery housing.

12. The electric scooter of claim 1, further comprising one or more AC charging ports or USB output ports.

13. The electric scooter of claim 12, wherein the one or more AC charging ports or USB output ports are located on a side of the platform or on the battery box.

14. The electric scooter of claim 1, wherein the electric scooter is either foldable or fixed.

15. The electric scooter of claim 14, wherein the vertical tube is pivotally connected to the platform, for pivoting the scooter between an upright position for use and a collapsed position for storage.

16. The electric scooter of claim 15, wherein the handle bar element is collapsible.

17. The electric scooter of claim 14, wherein the handle bar element is collapsible.

18. The electric scooter of claim 1, wherein the battery housing comprises a holder configured to removably receive and hold at least two battery packs, and wherein the two battery packs are positioned opposite to one another in opposite directions, and each are interchangeable between the electric scooter and the separate battery-operated electric power or gardening tool.

19. The electric scooter of claim 18, wherein the holder is configured to receive two slide-type battery packs by sliding the two battery packs horizontally onto the holder in opposite directions.

20. The electric scooter of claim 3, wherein the battery pack is an insert-type battery pack, and is interchangeable between the electric scooter and the separate battery-operated electric power or gardening tool.

* * * * *